March 12, 1968    P. R. JOHANNESSEN    3,373,346
LINEAR REACTIVE VOLTAGE CONTROL NETWORKS
Filed Feb. 25, 1965
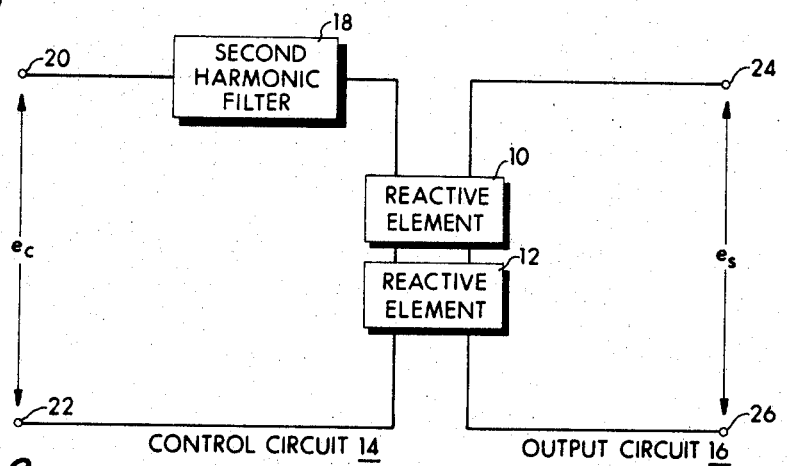
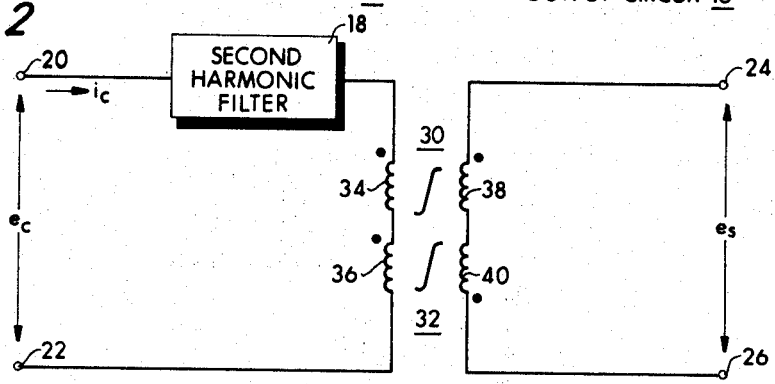
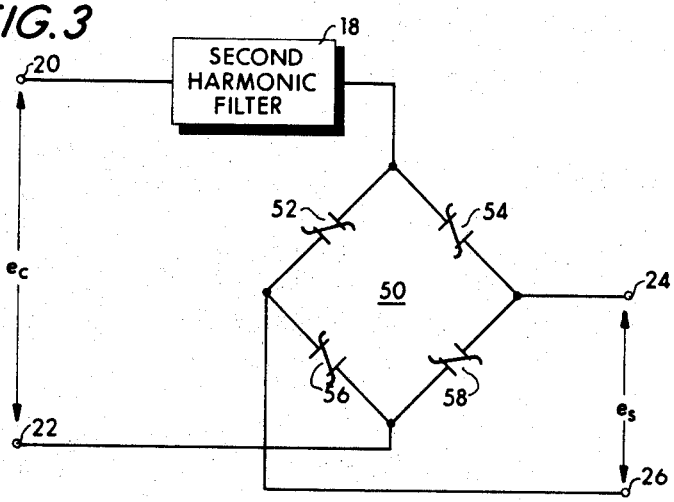
INVENTOR
PAUL R. JOHANNESSEN
BY
ATTORNEY 3,373,346
LINEAR REACTIVE VOLTAGE CONTROL NETWORKS
Paul R. Johannessen, Lexington, Mass., assignor to Sylvania Electric Products Inc., a corporation of Delaware
Filed Feb. 25, 1965, Ser. No. 435,252
5 Claims. (Cl. 323—75)

This invention relates to electrical circuits and more particularly to electrically controllable linear reactive networks.

In the design of electrical tuned circuits, it is often desirable to have a linear reactive network to avoid spurious harmonic generation which degrades circuit performance. The simplest reactive elements are, of course, the inductor and the capacitor but these elements are inherently non-linear and unsuitable from the standpoint of harmonic generation. Mechanical tuning schemes are well known but these are not suitable for rapid automatic control. Wholly electrical networks have been designed which are linear over a given range of frequencies but these networks, generally, are complex and cumbersome. It would be advantageous to have a relatively simple network which is linear over a desired frequency range and which is electrically controllable. It is, therefore, an object of the present invention to provide such a linear reactive network.

Another object of the invention is to provide an electrically controllable linear reactive network.

Another object of the invention is to provide a reactive network wherein the control circuit is isolated from the output circuit.

Briefly, the invention comprises a plurality of non-linear reactive elements connected in a balanced network having a control circuit and an output circuit. The reactive elements each have identical quadratic characteristics and the control circuit has a high immittance at the second harmonic of the operating frequency. The output circuit is isolated from the control circuit by the balancing action of the network, has essentially no harmonic distortion, and acts as a linear reactance whose magnitude is electrically alterable by varying the signal applied to the control circuit.

The invention will be more fully understood from the following detailed description, taken in conjunction with the accompanying drawing, in which:

FIG. 1 is a schematic block diagram representation of a linear reactive network constructed according to the invention;

FIG. 2 is a schematic representation of one embodiment of the invention; and

FIG. 3 is a schematic representation of another embodiment of the invention.

Referring to FIG. 1, there is shown a balanced network which includes a pair of series-connected, four-terminal, non-linear reactive elements 10 and 12 which interconnect a control circuit 14 and an output circuit 16. These reactive elements have identical quadratic non-linear characteristics and provide isolation between the control circuit and the output circuit. One terminal of reactive-element 10 is connected through a second-harmonic filter 18 to control terminal 20, control terminal 22 being connected to one terminal of reactive element 12. The remaining terminals of elements 10 and 12 are connected respectively to output terminals 24 and 26 which connect to a circuit in which the network is utilized. Filter 18 presents a high immittance to the second harmonic of the operating frequency, for reasons to be explained subsequently.

In operation, a direct current control voltage $e_c$ is impressed upon terminals 20 and 22, and output terminals 24 and 26 are connected to utilization circuitry, which may be, for example, a tuned circuit wherein the present network acts as one of the operative components. It has been discovered that the output circuit will function as a linerally variable reactor with essentially no harmonic distortion provided the reactive elements have identical quadratic characteristics and filter 18 has a high immittance at the second harmonic of the operating frequency of the network. By the mathematics of circuit analysis, it can be shown that an alternating current potential $e_s$, from the utilization circuit, across output terminals 24 and 26 does not contain any harmonics of the operating frequency. A second harmonic component, however, is present in the control circuit and, were it not for filter 18, would cause additional harmonics to be generated in both the control circuit and output circuit. For example, a second harmonic component in the control circuit would cause a third harmonic to be generated in the output circuit, which, in turn, would generate a fourth harmonic in the control circuit. Higher order harmonics would be generated in like manner. This spurious harmonic generation is greatly reduced by making the immittance of the control circuit sufficiently high at the second harmonic frequency so that only a negligible second harmonic current flows. Filter 18 provides this high immittance, and can be any one of the well known rejection filters which has the desired high immittance over the frequency band of interest.

The impedance of the output circuit is a linear function of the control circuit current or voltage, depending upon the type of reactive elements employed; thus, the output circuit behaves as a linear reactive network. Isolation between the control circuit and the output circuit is achieved because of the nature of the balanced circuit.

The network of FIG. 1 can be implemented in several ways, such as the embodiments of FIG. 2 and FIG. 3. In the circuit of FIG. 2, the reactive elements are a pair of saturable reactors 30 and 32, including respective control windings 34 and 36, and output winding 38 and 40. The windings are poled as shown so that the fluxes produced by the currents in the output windings are opposing. In accordance with the teaching of the invention, reactors 30 and 32 have identical square-law flux-linkage versus current characteristics. Filter 18 can be any one of the well known band rejection filters which provide a specified impedance over a given frequency band. In operation, an alternating current potential $e_s$, from the circuit in which the network is utilized, is impressed across output terminals 24 and 26, and a direct current control voltage $e_c$, from a suitable power source (not shown), is applied to control terminals 20 and 22. Control windings 34 and 36 are thereby energized to bias the respective saturable reactors 30 and 32. The impedance of the output circuit is a linear function of the control current $i_c$, and is variable simply by adjusting the magnitude of this current. No undesirable harmonics are generated because of the output circuit linearity and the action of filter 18, and isolation between control and output circuits is achieved because of the nature of the balanced circuit.

An alternative implementation is illustrated in FIG. 3 wherein the reactive elements are varactors 52, 54, 56 and 58, having identical square law characteristics and arranged in a bridge network 50. The varactors are biased by well known means (not shown) to operate in the square law region of their characteristic curve. The operation of the circuit is the same as that of FIG. 2, but in this case the output impedance is a linear function of the control voltage $e_c$.

From the foregoing, it is evident that a simple, electrically controllable, linear reactive network has been provided which exhibits very low harmonic distortion. The illustrated embodiments are exemplary only and it is not intended to limit the scope of the invention by what has been particularly shown and described, except as indicated in the appended claims.

What is claimed is:

1. An electrically controllable, linear reactive network whose output impedance varies linearly with variations in a control signal comprising, a plurality of reactive elements each having identical quadratic characteristics, a control circuit connected to and operative to bias said reactive elements, means connected to said control circuit and operative to provide a high immittance at the second harmonic of the operating frequency, and an output circuit connected to said reactive elements.

2. An electrically controllable, linear reactive network whose output impedance varies linearly with variations in a control signal comprising, a plurality of reactive elements each having identical quadratic characteristics, a control circuit connected to and operative to bias said reactive elements, a band rejection filter connected to said control circuit and having a high immittance at the second harmonic of the operating frequency, and an output circuit connected to said reactive elements.

3. An electrically controllable, linear reactive network comprising, a first and a second saturable reactor, each having a control winding and an output winding with respective control windings and output windings being connected in series, said reactors having identical flux linkage versus current characteristics, a source of direct current control voltage, a band rejection filter connected in series with said source of control voltage and said series-connected control windings and having a high impedance at the second harmonic of the operating frequency, and means connecting said series-connected output windings to a utilization circuit.

4. An electrically controllable, linear reactive network comprising, four varactors having identical square law characteristics and connected in a bridge configuration with a pair of input terminals located respectively at the first and third junctures between adjacent varactors, and a pair of output terminals located respectively at the second and fourth junctures between adjacent varactors, a source of direct current control voltage, a band rejection filter connected in series with said source of control voltage and the input terminals of said bridge configuration and having a high admittance at the second harmonic of the operating frequency, and means connecting the output terminals of said bridge configuration to a utilization circuit.

5. An electrically controllable, linear reactive network operative over a band of frequencies and comprising, first and second non-linear reactive elements each having identical square law characteristics and connected between a control circuit and an output circuit, said control circuit including a direct current control signal and a band rejection filter having a high immittance at the second harmonic of the operating frequencies, said output circuit having no spurious harmonic frequencies and having an impedance which is a linear function of said control signal.

References Cited

UNITED STATES PATENTS

| | | | |
|---|---|---|---|
| 3,051,889 | 8/1962 | Selin | 323—7 |
| 3,115,603 | 12/1963 | Fluegel | 324—60 |
| 3,184,677 | 5/1965 | Jacobsen | 323—89 |
| 3,221,244 | 11/1965 | Biringer | 323—89 X |

JOHN F. COUCH, *Primary Examiner.*

W. E. RAY, *Assistant Examiner.*